(12) United States Patent
Nichols

(10) Patent No.: US 7,678,177 B2
(45) Date of Patent: Mar. 16, 2010

(54) MEMBRANE AIR DRYER AND SWEEP VALVE

(75) Inventor: Randall W. Nichols, Westlake, OH (US)

(73) Assignee: New York Air Brake Corporation, Watertown, NY (US)

( * ) Notice: Subject to any disclaimer, the term of this patent is extended or adjusted under 35 U.S.C. 154(b) by 804 days.

(21) Appl. No.: 11/519,342

(22) Filed: Sep. 12, 2006

(65) Prior Publication Data

US 2008/0060517 A1 Mar. 13, 2008

(51) Int. Cl.
*B01D 53/22* (2006.01)
(52) U.S. Cl. .................. 95/52; 95/19; 95/22; 95/23; 95/45; 96/4; 96/7; 96/8; 96/10; 96/421; 210/640; 137/115.03; 251/61.4
(58) Field of Classification Search .............. 95/1, 95/19, 22, 23, 45, 52; 96/4, 7, 8, 10, 421, 96/422; 210/640; 137/115.03; 251/61.4
See application file for complete search history.

(56) References Cited

U.S. PATENT DOCUMENTS

| | | | |
|---|---|---|---|
| 4,033,371 A | 7/1977 | Keedwell | |
| 4,256,021 A | 3/1981 | Graninger | |
| 5,160,514 A * | 11/1992 | Newbold et al. | 96/8 |
| 5,288,308 A * | 2/1994 | Puri et al. | 96/8 |
| 5,411,662 A * | 5/1995 | Nicolas et al. | 96/10 |
| 5,525,143 A | 6/1996 | Morgan et al. | |
| 5,605,564 A | 2/1997 | Collins | |
| 5,885,329 A * | 3/1999 | Hermann | 95/52 |
| 5,961,692 A * | 10/1999 | Collins | 95/45 |
| 6,004,383 A | 12/1999 | Kuhnelt | |
| 6,070,339 A | 6/2000 | Cunkelman | |
| 6,128,825 A | 10/2000 | Cunkelman | |
| 6,180,168 B1 | 1/2001 | Stookey et al. | |
| 6,296,683 B1 | 10/2001 | Koch | |
| 6,540,817 B1 * | 4/2003 | Hachimaki | 96/8 |
| 6,719,825 B2 | 4/2004 | Wedge et al. | |
| 6,740,140 B2 | 5/2004 | Giglia et al. | |
| 6,764,529 B2 | 7/2004 | Nichols et al. | |
| 6,881,245 B2 | 4/2005 | Nichols et al. | |
| 6,923,845 B2 | 8/2005 | Nichols et al. | |
| 7,153,341 B2 | 12/2006 | Hoyt et al. | |

(Continued)

FOREIGN PATENT DOCUMENTS

JP 9-57043 * 3/1997

(Continued)

OTHER PUBLICATIONS

Partial International Search Report for International Application No. PCT/US2007/015733, mailed Jan. 11, 2008.

(Continued)

*Primary Examiner*—Jason M Greene

(57) ABSTRACT

A membrane air dryer includes a proportioning valve for providing sweep air to the dryer. The valve may be located in an easily accessible location and may be oriented so that the movable valve element extends transverse to the length of the shell. The valve may be configured to allow air to flow back from the delivery port to the fibers during a compressor unload cycle to maintain pressure on the fibers, while blocking flow of air from the delivery port to the sweep chamber.

31 Claims, 3 Drawing Sheets

U.S. PATENT DOCUMENTS

2007/0113738 A1* 5/2007 Nakano ............................ 96/4
2009/0151557 A1* 6/2009 Suzuki ........................... 95/52

FOREIGN PATENT DOCUMENTS

JP          09057043        3/1997

OTHER PUBLICATIONS

Invitation to Pay Additional Fees for International Application No. PCT/US2007/015733, mailed Jan. 11, 2008.
Hankison, Sweepsaver Series & HMM Series (Brochure), Modular Membrane Compressed Air Dryers, Energy Savings Through Selective Permeation, 2007 (4 pages).
International Search Report and Written Opinion for International Application No. PCT/US2007/015733, mailed May 8, 2008.

* cited by examiner

MEMBRANE AIR DRYER AND SWEEP VALVE

BACKGROUND

The present invention relates to a vehicle compressed air system, an air dryer for such a system, and a sweep proportioning valve for such an air dryer.

DESCRIPTION

Figure 1:
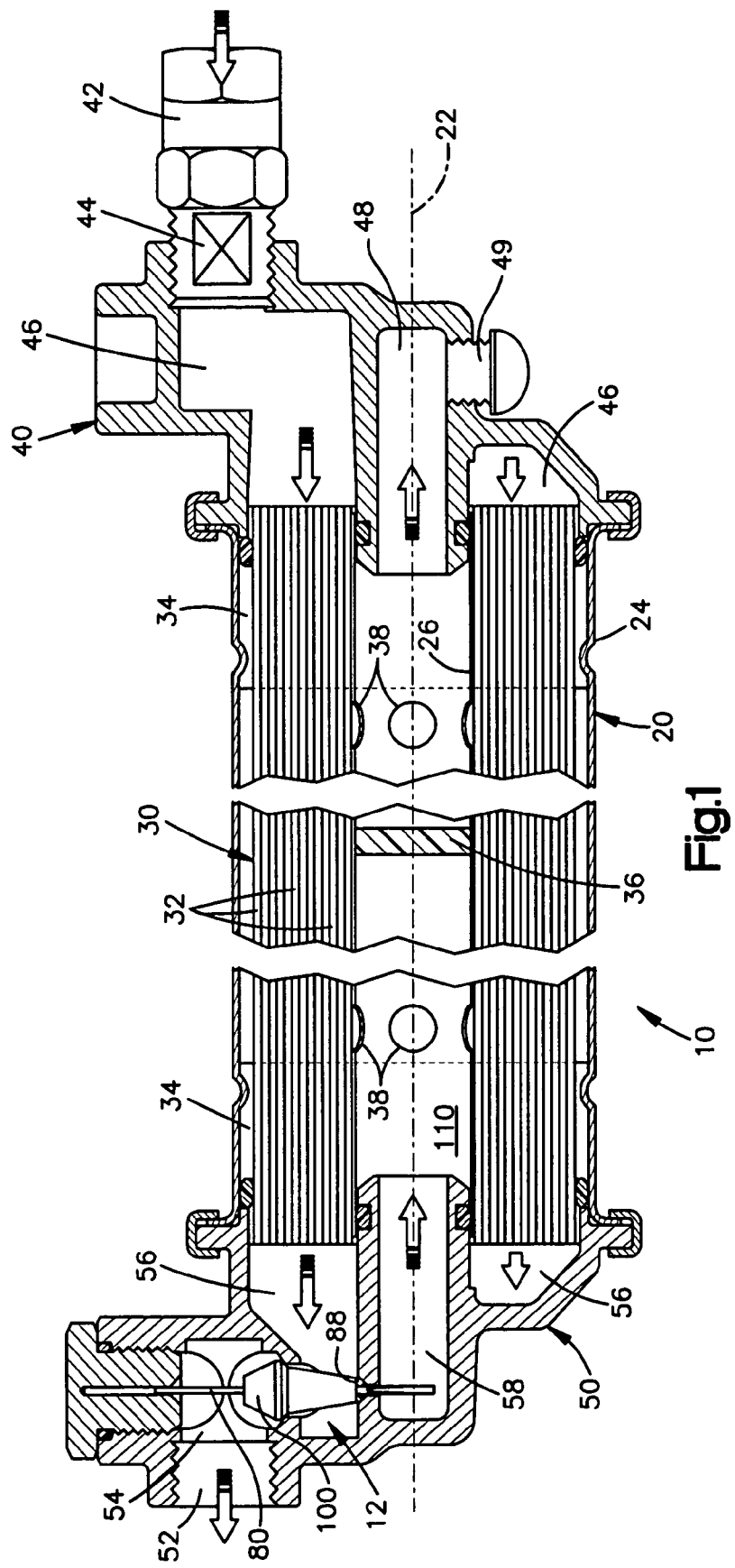
FIG. 1 is an illustration of a bore fed membrane air dryer including a sweep valve, which is a first representative embodiment of the invention.
Figure 3:
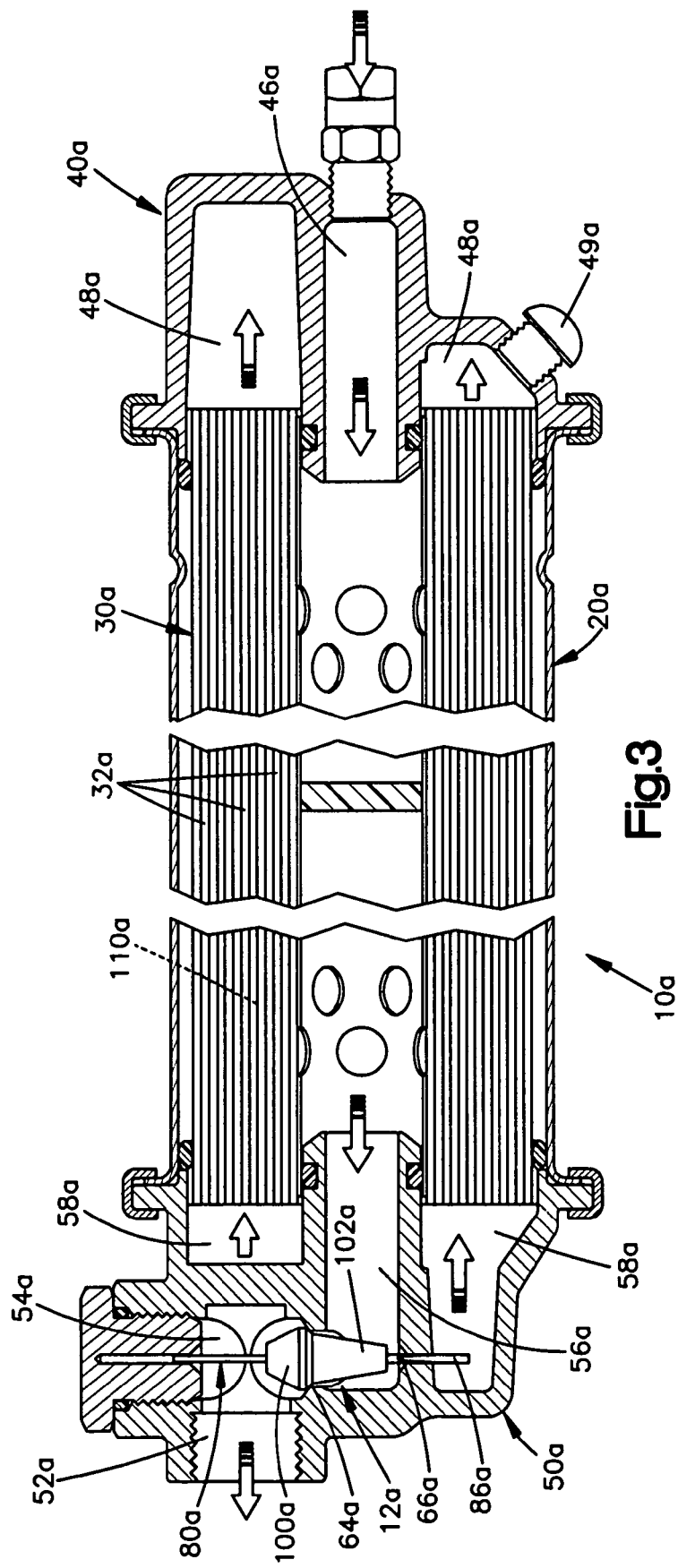
FIG. 3 is an illustration of a shell fed membrane air dryer including a sweep valve, which is a second representative embodiment of the invention.

The present invention relates to a vehicle compressed air system, an air dryer for such a system, and a sweep proportioning valve for such an air dryer. The present invention is applicable to various types of air dryers. For example, the invention is applicable to bore-fed membrane air dryers, and to shell-fed membrane air dryers. FIG. 1 shows a bore-fed membrane air dryer 10 with a sweep valve 12. The sweep valve 12 of FIG. 1 is also usable in association with a shell-fed membrane air dryer, as will be described below in more detail. FIG. 3 shows a shell-fed membrane air dryer 10a with a sweep valve 12a. The sweep valve 12a of FIG. 3 is also usable in association with a bore-fed membrane air dryer, as will be described below in more detail.

In the embodiment of FIG. 1, the dryer 10 includes a shell 20. In the illustrated embodiment, the shell has an elongate cylindrical configuration centered on an axis 22. The shell 20 includes an imperforate outer tube 24 and a perforated inner tube 26.

A tubular bundle 30 of fibers 32 is supported in the shell 20 between the inner and outer tubes 24 and 26. Each fiber 32 is a membrane having a bore though which air to be dried can be passed, to remove water from the air. The bundle 30 of fibers 32 forms a membrane assembly in the dryer 10. At each end of the bundle 30 is an epoxy plug 34 that seals the spaces between the various fibers 32, to provide a barrier between the high pressure side of the dryer 10 and the low pressure side of the dryer.

In the approximate center of the inner tube 26 is a stopper or plug 36, which may be made of an elastomeric material, such as rubber. The stopper 36 impedes or blocks air flow longitudinally through the inner tube 26 and forces air flowing through openings 38 in the inner tube to move radially outward into the bundle 30 of fibers.

An inlet housing 40 is located at one end of the shell 20. The inlet housing 40 has a compressor inlet 42 with a check valve shown schematically at 44. The compressor inlet 42 opens into an inlet chamber 46 that directs compressed air into the bores of the fibers 32. The inlet housing 40 also has a centrally located sweep air outlet chamber 48, that opens from the inner tube 26 of the shell 20. The sweep air outlet chamber 48 has a vent 49 for venting air and water to the atmosphere.

A sweep valve housing 50 is located at the other end of the shell 20. The valve housing 50 has a delivery port 52 for directing air out of the dryer 10 to the system including the reservoir. The delivery port 52 opens from an outlet chamber 54 in the valve housing 50. The valve housing 50 also defines a delivery chamber 56 into which the bores of the fibers 32 in the bundle 30 open. The delivery chamber 56 extends about a sweep air inlet chamber 58 that opens into the inner tube 26 of the shell 20.

The sweep valve 12 (FIG. 2) is located in the housing 50. The sweep valve 12 includes a movable valve element 62 and two fixed valve elements. The fixed valve elements are on the valve housing 50 and include a first valve seat 64 and a second valve seat 66. The first valve seat 64 extends around an opening 68 in the valve housing 50 that enables air to flow between the delivery chamber 56 and the outlet chamber 52. The second valve seat 66 extends around an opening 70 in the valve housing 50 that enables air to flow between the delivery chamber 56 and the sweep air inlet chamber 58.

The movable valve element 62 includes a needle 80 and a bobbin 100 supported on the needle for movement together with the needle. The needle 80 and bobbin 100 extend, and move, transversely to the longitudinal extent of the dryer. In this embodiment, for example, the needle 80 and bobbin 100 extend, and move, perpendicular to the longitudinal extent of the dryer.

The needle 80 has a cylindrical configuration. The lower portion 82 of the needle 80, below the bobbin 100, is tubular. A flat is machined on one side of the lower portion 82 of the needle 80, to provide a tapered opening 86 in the lower portion of the needle. This configuration is less expensive to fabricate than, for example, machining a conical end portion of the needle 80.

The lower portion 82 of the needle 80 extends through the opening 70 in the valve housing 50 between the delivery chamber 56 and the sweep air inlet chamber 58. The second valve seat 66 extends around the opening 70 and thus around the lower portion 82 of the needle 80.

Figure 2:
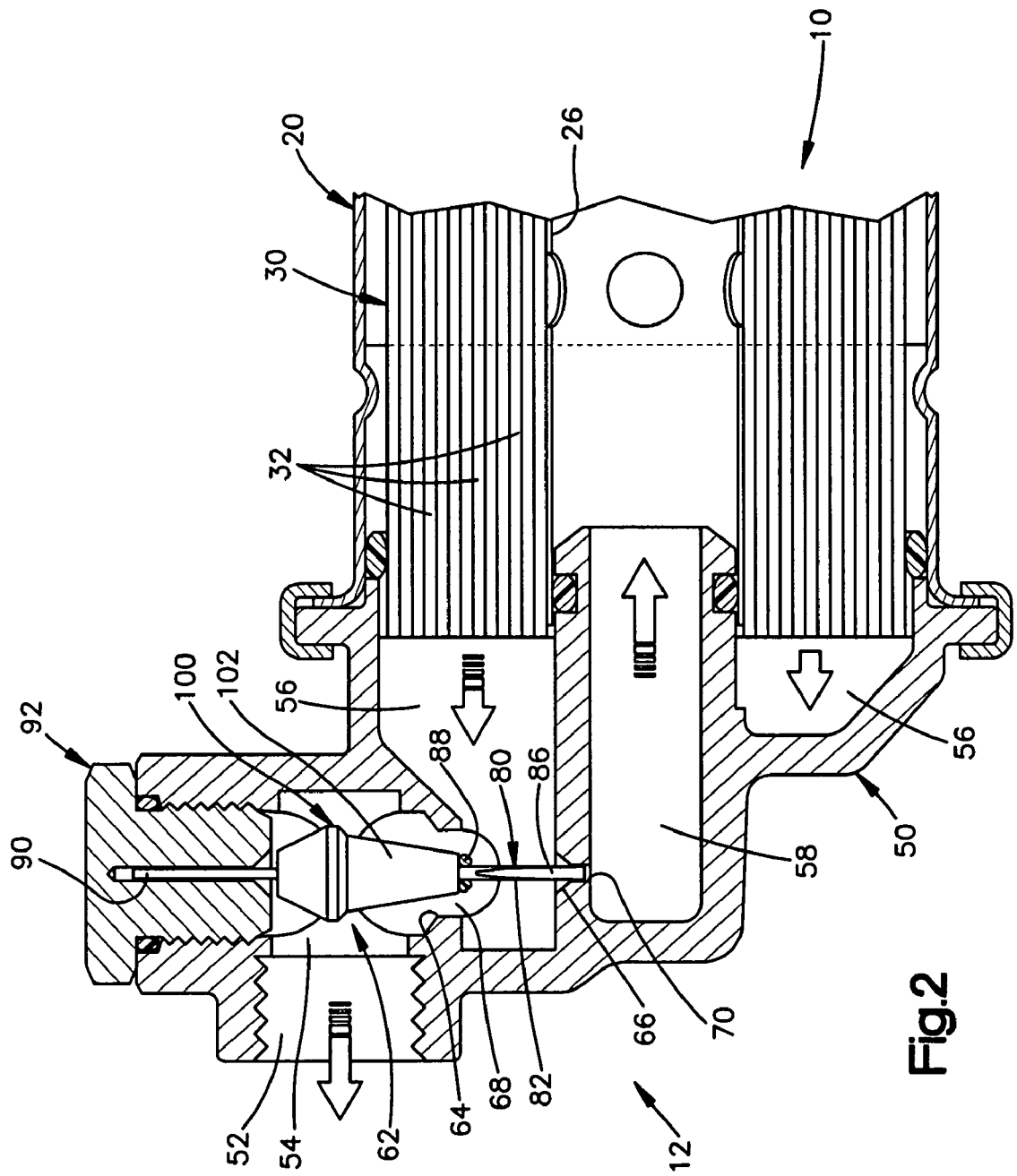
FIG. 2 is an illustration showing parts of the sweep valve of the first embodiment, in a different condition of operation.

An O-ring as shown at 88 in FIG. 2 is smaller than the needle 80 and is stretched onto the needle. Thus, the O-ring 88 moves with the needle 80 as the movable valve element 62 moves. The O-ring 88 is movable between a first position shown in FIG. 1 resting on and sealing against the second valve seat 66, and a second position shown in FIG. 2 spaced apart from the second valve seat and allowing air to flow from the delivery chamber 56 into the sweep air inlet chamber 58.

The upper portion 90 of the needle 80, above the bobbin 100, is movably supported in a cap 92 that is threaded into the valve housing 50 at an accessible location on the exterior of the end of the dryer 10. The cap 92 can be unscrewed from the valve housing 50 for easy access to and maintenance of the sweep valve 12.

The bobbin 100 may be made from plastic or metal, or from another material. The bobbin 100 extends through the opening 68 in the valve housing 50 between the delivery chamber 56 and the outlet chamber 54. The first valve seat 64, which extends around the opening 68, is engageable by the bobbin 100. In the particular embodiment shown in FIG. 1, this is not a sealing engagement; rather, air can leak past the area of engagement, as discussed below.

The bobbin 100 has a tapered main body portion 102 that is locatable below the first valve seat 64. The tapered portion 102 of the bobbin 100 is located at least partially in the delivery chamber 56 at a location between the fiber bundle 30 and the first valve seat 64. As a result, the tapered portion 102 of the bobbin 100 is exposed to flow of pressurized air flowing from the fiber bundle 30 when the system is being charged.

When the system is charging, compressed air from the compressor flows through the compressor inlet 42 and into the inlet chamber 46. The compressed air flows through the bores of the fibers 32 and is dried therein. Water that is removed from the air migrates to the outside of the fibers 32.

The dried air from the fibers 32 of the fiber bundle 30 flows into the delivery chamber 56 of the valve housing 50. The dried air engages the tapered surface 102 of the bobbin 100 and forces the bobbin to move upward as viewed in FIGS. 1 and 2. As the bobbin 100 moves upward, it moves off the first valve seat 64, allowing dried air to flow from the delivery chamber 56 to the outlet chamber 54 and thence through the delivery port 52 to the reservoir. The amount of movement of the bobbin 100 is proportional to the flow of air.

Also as the bobbin 100 moves upward, it pulls the needle 80 upward. The lower portion 82 of the needle 80 moves in the opening 70, as the O-ring 88 moves away from the second valve seat 66. This movement enables dried air to flow from the delivery chamber 56, through the opening 70, and into the sweep air inlet chamber 58. The volume of flow is proportional to the amount of needle movement. Thus, the flow of dried air delivered to the sweep air inlet chamber 58 is proportional to the flow of dried air to the delivery port 52. This proportionality is in accord with the increased amount of air being dried and moisture being removed.

The inner tube 26 of the shell 20, together with the spaces between the several fibers 32, forms a sweep air chamber 110 of the dryer 10. The sweep air flows from the sweep air inlet 58 chamber, into the portion of the sweep air chamber 110 that is in the inner tube 26. The sweep air flows through the perforations 38 in the inner tube 26 to surround the various fibers 32 and pick up moisture from them. The sweep air transports the moisture to the sweep air outlet chamber 48 and then to the vent 49.

An elongate dryer, such as the dryer 10, is typically mounted horizontally in a vehicle, such as a truck, because of space constraints. When the dryer 10 is mounted horizontally, the needle 80 and bobbin 100 extend and move vertically. As a result, the needle 80 and the bobbin 100 can close against their respective valve seats, 64 and 66, under the influence of gravity. No biasing member, such as a spring, is needed. This can provide a less complex and more reliable sweep valve mechanism.

In addition, the end mounting of the sweep valve 12 (on the end of the dryer 10) provides easy access to the moving parts of the sweep valve. All that needs to be done is for the cap 92 to be unthreaded and the movable valve element 62 to be lifted out.

Minimizing deep pressure cycling of the fibers 32 can be beneficial to durability of the fibers. Thus, it may be desirable to maintain a continuous pressure within the bores of the fibers 32, or at least to keep pressure variation over time to a relatively low degree, for example, the 15-20 psi pressure differential between the low and high pressures at which the system governor turns the compressor on and off.

In the dryer 10 of FIG. 1, this is accomplished by providing reservoir pressure to the bores of the fibers 32 when the compressor is not charging. To this end, the bobbin 100 and/or first valve seat 64 of the sweep valve 12 of FIG. 1 are, as noted above, configured to provide a leakage path to allow some leakage around the bobbin where the bobbin is engageable with the first valve seat. As a result, when the compressor is unloaded and not forcing air into the bores of the fibers 32, air under pressure from the reservoir can flow back through the delivery port 52, past the bobbin 100, and into the bores of the fibers 32. This air is at reservoir pressure which is typically no more than 15-20 psi less than compressor output, rather than the 100 psi or greater pressure differential between compressor output pressure and ambient pressure. Therefore, the pressure variation in the bores of the fibers 32, over time, is limited, which can help to increase the durability of the fibers.

At the same time, it would not be desirable for air flowing back from the reservoir to enter the sweep chamber 110, because the sweep chamber is vented to atmosphere. Therefore, the sweep valve 12 of FIG. 1 is configured to provide a tight seal (via the O-ring 88, for example) at the location of the second valve seat 66. As a result, when air under pressure from the reservoir is flowing back through the delivery port 52 and past the bobbin 110, it can not flow past the needle 80 into the sweep chamber 110. Such flow is prevented by the tight seal of the sweep valve 12.

FIG. 3 illustrates a dryer 10a that is a second embodiment of the invention. Portions of the dryer 10a that are the same as or similar to portions of the dryer 10 are given the same reference numerals with the suffix "a" attached". In general the differences from the first embodiment are that the dryer 10a is a shell-fed dryer, not a bore-fed dryer; and the sweep valve seals at the bobbin and not at the needle.

The dryer 10a (FIG. 3) includes an inlet housing 40a that accepts compressed air centrally into an inlet chamber 46a. The inlet chamber 46a opens into the inner tube 26a of the shell 20a. The inlet housing 40a also has a sweep air outlet chamber 48a that extends around the inlet chamber 46a. The sweep air outlet chamber 48a communicates with the outlet ends of the fiber bundle 30a and has a vent 49a.

The dryer 10a includes a sweep valve housing 50a that accepts dried air centrally into a delivery chamber 56a. The delivery chamber opens into an outlet chamber 54a via an opening in the housing 50a.

The sweep valve housing 50a includes a sweep air inlet chamber 58a that extends around the delivery chamber 56a. The sweep air inlet chamber 58a is in fluid communication with the inlet ends of the fibers 32a in the bundle 30. The bores of the fibers 32a form a sweep chamber 110a of the dryer 10a. The sweep air inlet chamber 58a opens to the delivery chamber 56a via an opening in the housing 50a.

The movable valve element 62a includes a bobbin 100a having a tapered main body portion 102a disposed at least partially in the delivery chamber 56a. A lower portion of a needle 80a extends into the sweep air inlet chamber 58a. The lower portion of the needle 80a has a tapered opening 86a.

When the system is charging, compressed air from the compressor flows through the compressor inlet and into the inlet chamber 46a. The compressed air flows through the inner tube 26a and around the fibers 32a of the bundle 30a. The air is dried by contact with the fiber bundle 30a. Water that is removed from the air migrates to the bores of the fibers 32a.

The dried air from the shell 20a flows into the delivery chamber 56a of the valve housing 50a. The dried air engages the tapered surface 102a of the bobbin 100a and forces the bobbin to move upward.

As the bobbin 100a moves upward, it moves off the first valve seat 64a, allowing dried air to flow from the delivery chamber 56a to the outlet chamber 54a and thence through the delivery port 52a to the reservoir. The amount of movement of the bobbin 100a is proportional to the flow of air.

Also as the bobbin 100a moves upward, it pulls the needle 80a upward. The lower portion of the needle 80a moves upward away from the second valve 66a seat. This movement enables dried air to flow from the delivery chamber 56a into the sweep air inlet chamber 58a. The volume of flow is proportional to the amount of needle movement. Thus, the flow of dried air that is delivered to the sweep air inlet chamber 58a is proportional to the flow of dried air to the delivery port 52a. This proportionality is beneficial because it is in accord with the increased amount of air being dried and moisture being removed.

The sweep air flows from the sweep air inlet chamber 58a into the bores of the fibers 32a. The sweep air picks up moisture and transports it to the sweep air outlet 48a chamber and then to the vent 49a.

In the embodiment shown in FIG. 3, the bobbin 100a makes an air tight seal against backflow of air from the delivery port 52a, thus acting as a check valve. At the same time, the engagement of the needle 80a in the second valve seat 66a is configured to provide a leakage path to allow some leakage of air. This would allow a small flow of air from the inner tube 26a of the shell 20a through the sweep air chamber 58a of the dryer 10a to atmosphere, effectively opening the compressor output to atmosphere and depressurizing the discharge line from the compressor. This would allow the compressor, when it is loaded, to start against a depressurized line, which may be preferable. Also, the leaky needle valve may exhibit a reduced pull of force, or lift off force. The reduced stiction enables easier movement of the bobbin 100a and needle 80a.

In addition, allowing back flow of air through the sweep chamber 110a (the fiber bores in this embodiment) can provide for additional drying of the fibers 32a. This can be useful because some fibers dry less effectively at lower pressure differentials, such as are present when the compressor is starting up at the end of a charge cycle. Sweeping the membrane in this manner, to dry it further, can help to compensate for this potentially reduced effectiveness.

At least two other embodiments are possible. First, a shell-fed dryer can incorporate the sweep valve 12 of FIGS. 1 and 2. In this case, air from the reservoir is allowed to return to the dryer chamber, to maintain pressure on the side of the fibers that is pressurized during normal operation of the dryer. The return air would flow into the shell side of the dryer. The seal between the needle and the valve housing would prevent air from the reservoir from flowing into the sweep chamber.

Second, a bore-fed dryer can incorporate the sweep valve 12a of FIG. 3. In this case, air from the reservoir is blocked from returning to the dryer, by the seal between the bobbin and the valve housing. At the same time, the leakage path between the needle and the valve housing allows a small flow of air from the inner tube of the shell through the sweep air chamber to atmosphere, effectively opening the compressor output to atmosphere and depressurizing the discharge line from the compressor.

Having described the invention, I claim:

1. A membrane air dryer for removing moisture from compressed air, comprising:
    an elongate shell at least partially enclosing a membrane assembly having a tubular configuration extending along the length of the shell;
    a sweep valve housing at one end of the shell and supporting a sweep valve;
    the sweep valve including a fixed valve element on the housing;
    the sweep valve also including a movable valve element supported on the housing for movement relative to the fixed valve element in a direction transverse to the length of the shell, the movable valve element being oriented relative to the shell so that the movable element is moved by gravity into a closed position;
    the movable valve element being movable against the gravity in response to a flow of dried air from the membrane assembly to enable flow of a first portion of the dried air to a delivery port of the air dyer and flow of a second portion of the dried air to a sweep chamber as sweep air for the membrane assembly.

2. A dryer as set forth in claim 1 wherein the transverse direction is a generally perpendicular direction.

3. A dryer as set forth in claim 1 wherein the movable valve element is moved by the gravity into the closed position when the shell is oriented generally horizontally.

4. A dryer as set forth in claim 1 wherein the movable valve element is held in the valve housing by a single, externally accessible, threaded cap located near the end of the air dryer.

5. A dryer as set forth in claim 1 wherein the flow of dried air to the sweep chamber increases proportionately to the flow of dried air to the delivery port.

6. A dryer as set forth in claim 1 wherein the membrane air dryer is a shell-fed dryer and the sweep chamber includes the bores of a bundle of fibers that form the membrane assembly.

7. A dryer as set forth in claim 1 wherein the membrane air dryer is a bore-fed dryer and the sweep chamber includes the spaces around the fibers in a bundle of fibers that form the membrane assembly.

8. A dryer as set forth in claim 1 wherein the sweep valve is configured to allow air to flow back from the delivery port to the fibers during a compressor unload cycle to maintain pressure on the fibers while blocking flow of air from the delivery port to the sweep chamber.

9. A dryer as set forth in claim 1 wherein the movable valve element comprises:
    a bobbin that is contacted by the flow of dried air to move the movable valve element, the bobbin seating against the fixed valve element to block return flow through the sweep valve; and
    a needle fixed for movement with the bobbin, the needle having a cylindrical configuration with a flat on one side to form a tapered opening along its outside.

10. A dryer as set forth in claim 9 further including a seal on the needle for blocking flow of air from the delivery port to the sweep chamber.

11. A membrane air dryer for removing moisture from compressed air, comprising:
    an elongate shell having an inlet port for receiving compressed air from a compressor;
    a membrane assembly in the shell, comprising a plurality of fibers;
    a sweep valve housing on the shell and supporting a sweep valve, the sweep valve including a fixed valve element on the housing; and
    the sweep valve including a movable valve element supported on the housing for movement relative to the fixed valve element, in response to a flow of dried air from the fiber, to enable flow of a first portion of the dried air to a delivery port of the air dyer and flow of a second portion of the dried air to a sweep chamber of the membrane assembly; and
    the sweep valve being configured to allow air to flow back from the delivery port to the fibers during a compressor unload cycle to maintain pressure on the fibers, while blocking flow of air from the delivery port to the sweep chamber.

12. A dryer as set forth in claim 11 wherein the flow of dried air to the sweep chamber increases proportionately to the flow of dried air to the delivery port.

13. A dryer as set forth in claim 11 wherein the dryer is a bore-fed dryer, and the fibers are formed in a tubular bundle of fibers with spaces between them that at least partially form the sweep chamber.

14. A dryer as set forth in claim 11 wherein the dryer is a shell-fed dryer.

15. A dryer as set forth in claim 11 further including a check valve at the inlet port of the air dryer for preventing air flow back through the delivery port.

16. A dryer as set forth in claim 11 wherein the movable valve element has a first valve element portion that is movable in response to flow of the first portion of the dried air to the delivery port, and a second valve element portion that is movable with the first valve element portion to control flow of the second portion of the dried air to the sweep chamber; the sweep valve including a seal at the second valve element portion for blocking flow of air from the delivery port to the sweep chamber.

17. A dryer as set forth in claim 16 wherein the sweep valve is configured to allow leakage of air from the delivery port to the fibers at the second valve element portion.

18. A method comprising the steps of:
directing compressed air from a compressor past fibers of a membrane air dryer when the compressor is loaded to dry the compressed air;
directing the dried air to move a movable element against gravity for enabling flow of a first portion of the dried air to a reservoir and a second portion of the dried air to a sweep chamber;
directing the dried air into the reservoir under pressure, said step of directing the dried air being performed at a charging pressure that is higher than the reservoir pressure; and
allowing air from the reservoir to flow back to the fibers when the compressor is not loaded, to maintain pressure on the fibers.

19. A method as set forth in claim 18 wherein the dryer is a bore-fed dryer.

20. A method as set forth in claim 18 wherein the dryer is a shell-fed dryer.

21. A method as set forth in claim 18 further including the step of blocking flow of air from the reservoir to a sweep chamber of the air dryer simultaneously with said step of allowing air from the reservoir to flow back to the fibers when the compressor is not loaded.

22. A method as set forth in claim 18 wherein said steps of allowing air from the reservoir to flow to the fibers and blocking flow of air from the reservoir to the sweep chamber, are performed by allowing flow of air past a first valve seat of a movable sweep valve element and blocking flow of air past a second valve seat of the movable sweep valve element.

23. A method as set forth in claim 18 wherein the pressure in the reservoir is maintained within an about 20 psi range between the loaded and unloaded cycles of the compressor.

24. A method as set forth in claim 18 wherein said step of directing the dried air includes enabling flow of a first portion of the dried air to a delivery port of the air dyer and proportional flow of a second portion of the dried air to a sweep chamber of the membrane air dryer.

25. A membrane air dryer for removing moisture from compressed air, comprising:
an elongate shell having an inlet port for receiving compressed air from a compressor;
a membrane assembly in the shell, comprising fibers for receiving compressed air from the compressor;
a sweep chamber in the shell;
a sweep valve housing on the shell and supporting a sweep valve having a fixed valve element on the housing;
the sweep valve including a movable valve element supported on the housing for movement relative to the fixed valve element, in response to a flow of dried air from the fibers, to enable (1) flow of a first portion of the dried air to a delivery port of the air dyer and (2) flow of a second portion of the dried air to a sweep chamber of the membrane assembly; and
the sweep valve including means for enabling air to flow back from the delivery port to the fibers during a compressor unload cycle to maintain pressure on the fibers while blocking flow of air from the delivery port to the sweep chamber.

26. A dryer as set forth in claim 25 wherein the dryer is a bore-fed dryer.

27. A dryer as set forth in claim 25 wherein the dryer is a shell-fed dryer.

28. A dryer as set forth in claim 25 wherein the movable valve element has a first valve element portion that is movable to control flow of the first portion of the dried air to the delivery port, and a second valve element portion that is movable with the first valve element portion to control flow of the second portion of the dried air to the sweep chamber;
the means for enabling including a seal at the second valve element portion for blocking flow of air from the delivery port to the sweep chamber.

29. A dryer as set forth in claim 28 wherein the seal comprises an O-ring that is supported on and movable with the second valve element portion.

30. A dryer as set forth in claim 28 wherein the means for enabling comprises a leakage path at the first valve element portion for enabling leakage of air from the delivery port to the fibers at the first valve element portion.

31. A dryer as set forth in claim 11 wherein the movable valve element is oriented relative to the shell so that the movable valve element is moved by gravity into the closed position when the shell is oriented generally horizontally.

* * * * *